(12) United States Patent
King (10) Patent No.: US 6,457,737 B1
(45) Date of Patent: Oct. 1, 2002

(54) COLLAPSIBLE CART WITH SHELF

(75) Inventor: David L. King, Arlington Heights, IL (US)

(73) Assignee: ICB, LLC, Arlington Heights, IL (US)

(*) Notice: Subject to any disclaimer, the term of this patent is extended or adjusted under 35 U.S.C. 154(b) by 0 days.

(21) Appl. No.: 09/316,413

(22) Filed: May 21, 1999

(51) Int. Cl.$^7$ ................................. B62B 1/12
(52) U.S. Cl. ............ 280/651; 280/79.3; 280/47.19; 280/47.35; 211/153
(58) Field of Search ............. 280/651, 47.19, 280/47.35, 79.3; 211/42, 134, 135, 151, 153; D34/19, 20, 21, 22; 248/441.1; 312/208.1, 233, 351.11, 351.12, 351.13; 434/429, 430, 432; 108/59, 143

(56) References Cited

U.S. PATENT DOCUMENTS

| | | | |
|---|---|---|---|
| 3,436,092 A | * 4/1969 | Werner | 280/36 |
| 3,827,376 A | * 8/1974 | Solomon | 108/91 |
| 3,827,573 A | 8/1974 | Guerette | 211/149 |
| 4,008,671 A | 2/1977 | Baldini | 108/113 |
| 4,151,803 A | * 5/1979 | Ferrera et al. | 108/41 |
| 4,202,278 A | 5/1980 | Wadenhed | 108/102 |
| 4,236,460 A | * 12/1980 | Poupko | 108/41 |
| 4,740,010 A | 4/1988 | Moskovitz | 280/641 |
| 5,016,948 A | 5/1991 | Welch et al. | 312/250 |
| 5,315,936 A | * 5/1994 | Smith | 108/165 |
| 5,429,432 A | 7/1995 | Johnson | 312/235.3 |
| 5,558,418 A | * 9/1996 | Lambright et al. | 312/321.5 |
| 5,738,230 A | * 4/1998 | Goldstein | 211/149 |
| 5,765,702 A | 6/1998 | Bustos et al. | 211/181.1 |
| 5,806,864 A | * 9/1998 | Zielinski et al. | 280/42 |
| 5,816,419 A | * 10/1998 | Lamson | 211/150 |
| 5,848,798 A | * 12/1998 | Halvorson, Jr. et al. | 280/47.35 |
| D404,874 S | 1/1999 | Sandy | D34/21 |

FOREIGN PATENT DOCUMENTS

| | | |
|---|---|---|
| DE | 19 39 148 A | 2/1971 |
| DE | 24 53 759 A | 1/1976 |
| FR | 61 885 E | 5/1955 |
| FR | 2 180 297 A | 11/1973 |
| FR | 2 180 397 | 11/1973 |

* cited by examiner

Primary Examiner—Brian L. Johnson
Assistant Examiner—J. Allen Shriver
(74) Attorney, Agent, or Firm—Pauley Petersen Kinne & Erickson

(57) ABSTRACT

The invention provides a collapsible cart for transporting books, files, and other items comprising a cabinet spine, at least one collapsible shelf, at least one fastener, and a plurality of wheels. The cabinet spine has a first surface whereupon at least one collapsible shelf is pivotally mounted. The collapsible shelf is movable between a first position generally perpendicular with respect to the cabinet spine and a second position generally parallel with respect to the cabinet spine. A fastener is attached to the cabinet spine and is designed to be coupled with the collapsible shelf when in the second position. A plurality of wheels are mounted underneath the collapsible cart to allow the cart to be transported from one location to another location. In one embodiment of this invention, first and second doors are pivotally mounted to each side of the cabinet spine. The collapsible cart can be placed in a collapsed position by moving the first collapsible shelf to the second position, and the first and second doors to a closed position.

15 Claims, 6 Drawing Sheets

COLLAPSIBLE CART WITH SHELF

BACKGROUND OF THE INVENTION

1. Field of the Invention

This invention generally relates to a collapsible cart for transporting books, files, or other items from one location to another location. More particularly, this invention relates to a collapsible cart having shelves which pivot from a first position generally perpendicular with respect to a cabinet spine to a second position generally parallel with respect to the cabinet spine, doors which close flat against the shelves and the cabinet spine, and wheels mounted underneath the collapsible cart.

2. Description of Prior Art

Collapsible carts used to transport items from one location to another have been known in the art for many years. These collapsible carts vary in size and design. Many of these collapsible carts are designed to carry lightweight loads, and therefore do not have much structural support. Typically these collapsible carts are not designed for transporting shelves full of books from one location to another in that they do not have a cabinet spine on which to rest books against. In addition, the shelves of these collapsible carts often lack sufficient support structures such as side doors with support bodies designed to support the full weight of a shelf of books. Moreover, many of these collapsible carts are not easily transported from one location to another when in a collapsed position.

U.S. Pat. No. 3,827,376 discloses a shelf rack in which the shelves can be collapsed to an essentially vertical position and the end frames supporting the shelves are connected by an essentially diagonal rail whereby the racks can be nested for storage. This invention does not disclose a cabinet spine on which to rest books against. Moreover, this invention lacks support structures such as side doors with support bodies designed to support the full weight of a shelf of books.

U.S. Pat. No. 3,827,573 discloses a folding cart having a side frame with end frames hinged to the side frame and a pair of shelves hinged to the side frame. The side frame includes a pair of oppositely facing U-shaped tubular members adjacent one another and defining an opening corresponding to the distance between end frames and between the shelves. This invention does not however disclose a cabinet spine on which to rest books against. Additionally, this invention does not disclose a folding cart which is easily transported from one location to another when in a collapsed position.

U.S. Pat. No. 4,008,671 discloses a trolley with folding shelves comprising two uprights mounted on feet having castors enabling the trolley to be moved about easily, in which the shelves are each formed as a pair of half-shelves pivotable about the edge adjacent the other half-shelf of the pair, and the feet each comprise two arms which are pivotable about a vertical axis between a first position extending perpendicular to the plane defined by the two uprights and a second position extending parallel to this plane. The uprights house a connecting mechanism between the half-shelves and the arms so that when the half shelves are moved about their axes from a horizontal to a vertical position the arms are moved by the connecting mechanism from their first to their second position. This invention does not however disclose a cabinet spine on which to rest books against, and lacks sufficient support structures like side doors with support bodies designed to support the weight of a shelf full of books.

U.S. Pat. No. 4,202,278 discloses a movable distribution container that is adjustable to vary its width. The container has a frame of generally right-angled parallelepipedic shape that supports a plurality of juxtaposed shelves. The vertical corners of the frame are defined by vertically-extending members, pairs of which are interconnected to form the sides of the frame. The sides are adjustably interconnected to each other. This invention suffers shortcommings in that it lacks sufficient support structures like side doors with support bodies designed to support the weight of a shelf full of books. Additionally, this invention does not disclose a cabinet spine on which to rest books against.

U.S. Pat. No. 5,315,936 discloses an erectable display stand whereupon moving side panels of the display stand towards each other causes shelf supports to automatically move individual shelves from shelf-up to shelf-down positions during erection of the stand from a collapsed to an erect state. This invention does not disclose sufficient support structures like side doors with support bodies mounted to the side doors designed to support the weight of a shelf full of books. In addition, since this invention does not disclose wheels, this invention cannot be used to transport shelves full of books from one location to another.

U.S. Pat. No. 5,738,230 discloses a folding article of furniture, such as a bookcase or other storage unit, which has in its conventional aspects a vertically extending back piece, at least one vertically extending side piece secured to the back piece, and a vertically spaced plurality of shelves secured to the back piece. Each side piece is pivotable over a 90° angle relative to the back piece between a parallel or collapsed orientation and a perpendicular or use orientation, and each shelf is pivotable over a 90° angle relative to the back piece between a parallel or collapsed vertical orientation and a perpendicular or use horizontal orientation. This invention does not disclose sufficient support structures like side doors with support bodies mounted to the side doors designed to support the weight of a shelf full of books. In addition, since this invention does not disclose wheels, this invention cannot be used to transport shelves full of books from one location to another.

U.S. Pat. No. 5,765,702 discloses a wheeled display rack comprising a back panel, two side panels connected to the edges of the back panel, a plurality of removable shelves and a wheeled support including rotatable wheels. The wheeled support is movable between an active position in which the display rack may be supported by the wheeled support and an interactive position in which the display rack may not be supported by the wheeled support. This invention does not disclose shelves pivotally mounted onto a cabinet spine which are movable between a first position generally perpendicular with respect to the cabinet spine and a second position generally parallel with respect to the cabinet spine.

U.S. Pat. No. 5,806,864 discloses a foldable or collapsible utility cart which may be alternated between a closed and an open, operable position. This invention further discloses four vertical legs with a plurality of shelves mounted thereon. The shelves are rotatable relative to the legs and foldable about a middle thereof so that the cart may be alternated between the open operable position and the closed position for storage purposes. This invention does not disclose a cabinet spine on which to rest books against.

It is apparent from the conventional collapsible carts that there is a need for a collapsible cart for transporting books, files and other items that is durable and rugged; that can support a large amount of weight; that is movable between a collapsed position, for transporting the collapsible cart from one location to another, and a transport position, for transporting books, files and other items; and that occupies significantly less area in the collapsed position than in the transport position.

SUMMARY OF THE INVENTION

It is one feature and advantage of this invention to provide a collapsible cart for transporting books, files and other items which is durable and rugged.

It is another feature and advantage of this -invention to provide a collapsible cart for transporting books, files and other items which can support a large amount of weight.

It is another feature and advantage of this invention to provide a collapsible cart for transporting books, files and other items that is movable between a collapsed position, for transporting the collapsible cart from one location to another, and a transport position, for transporting books, files and other items.

It is yet another feature and advantage of this invention to provide a collapsible cart for transporting books, files and other items that occupies significantly less area in the collapsed position than in the transport position.

The above and other features and advantages of this invention are accomplished with a collapsible cart that has a cabinet spine, a collapsible shelf, and wheels. In one embodiment according to this invention, a collapsible cart for transporting books, files, and other items has a cabinet spine, a first collapsible shelf, a first fastener, and a plurality of wheels. The cabinet spine has a first surface whereupon the first collapsible shelf is pivotally mounted. The first collapsible shelf is movable between a first position generally perpendicular with respect to the cabinet spine and a second position generally parallel with respect to the cabinet spine. The first fastener is attached to the cabinet spine and is coupled with respect to the first collapsible shelf when in the second position. The plurality of wheels are mounted underneath the collapsible cart and allow the cart to be transported from one location to another location.

In another embodiment of this invention, a second collapsible shelf is pivotally mounted onto the first surface and movable between the first and second positions. A first connecting arm is fastened to the first collapsible shelf and the second collapsible shelf, so that a user may simultaneously move the first and second collapsible shelves from the first position to the second position.

In yet another embodiment of this invention, a first door is pivotally mounted to one side of the cabinet spine. A second door is pivotally mounted to another side of the cabinet spine opposed to the first door. While the shelves are mounted in a generally horizontal position, the first and second doors are mounted in a generally vertical direction.

The collapsible cart is placed in a collapsed position by moving the first collapsible shelf to the second position, and the first and second doors to the closed position. By placing the collapsible cart in the collapsed position, a user can decrease the amount of area the collapsible cart occupies. The collapsed position is particularly useful when transporting one or more collapsible cart from one location to another, since more collapsible carts can be placed in the transport vehicle.

The collapsible cart can be placed in a transport position by moving the first collapsible shelf to the first position, and the first and second doors to the open position. By placing the collapsible cart in the transport position, a user can use the collapsible cart to transport books, files, and other items from one location to another.

In another embodiment of this invention, a third collapsible shelf and a fourth collapsible shelf are pivotally mounted onto a second surface of the cabinet spine, opposed to the first surface. The third and fourth collapsible shelves are movable between the first and second positions. A second connecting arm is fastened to the third and fourth collapsible shelves, so that a user may simultaneously move both the third and fourth collapsible shelves from the first position to the second position. A second fastener is attached to the cabinet spine and is coupled with respect to the third collapsible shelf when in the second position.

In yet another embodiment of this invention, a third door is pivotally mounted to one side of the cabinet spine. A fourth door is pivotally mounted to another side of the cabinet spine opposed to the third door. While the shelves are mounted in a generally horizontal position, the third and fourth doors are mounted in a generally vertical direction.

In another embodiment of this invention, the plurality of wheels are mounted underneath at least one of the first door, the second door, the third door, the fourth door, or the cabinet spine to more easily move the collapsible cart from one location to another. Preferably, one wheel is mounted underneath each of the first door, the second door, the third door, and the fourth door.

In yet another embodiment of this invention, the first, second, third, and fourth doors have an inside surfaces which face the cabinet spine. Support bodies are attached to at least one of the first and second doors, and at least one of the third and fourth doors in order to support the collapsible shelves.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
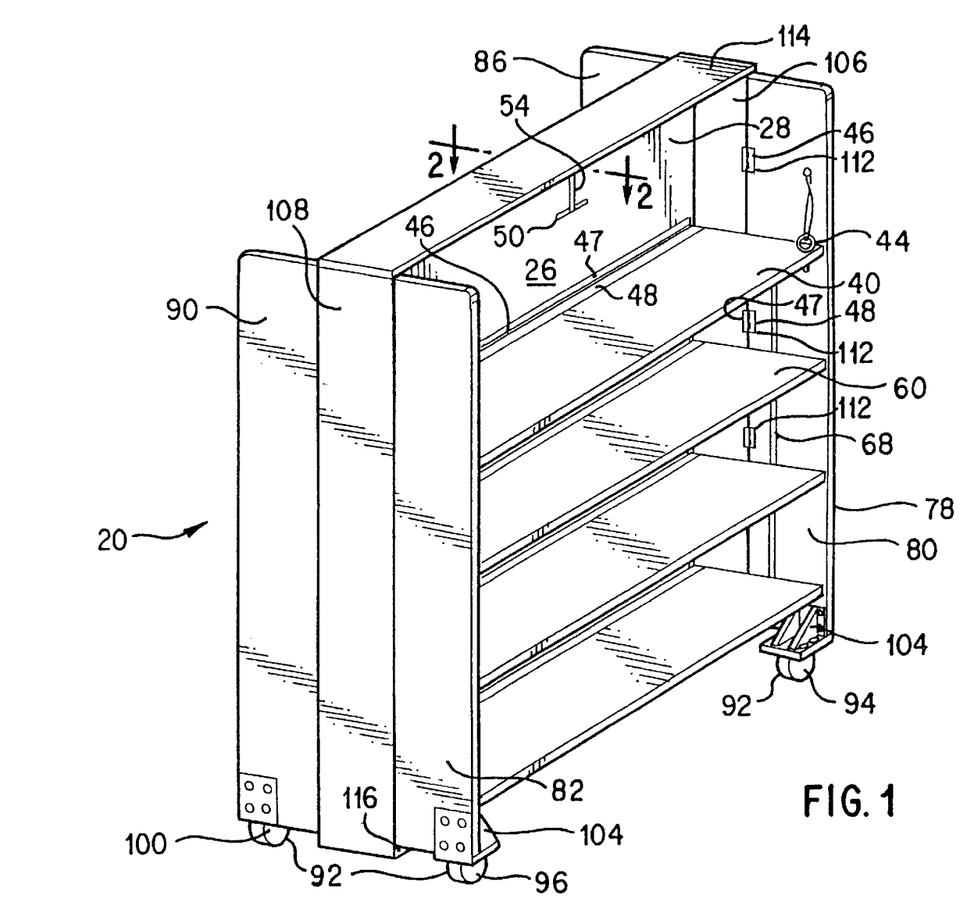
FIG. 1 is a perspective view of a collapsible cart in the transport position according to one embodiment of this invention.

FIG. 1 shows collapsible cart 20 for transporting books, files, and other items, according to one preferred embodiment of this invention. Collapsible cart 20 comprises cabinet spine 26, first collapsible shelf 40, first fastener 50, and a plurality of wheels 92. Cabinet spine 26 comprises first surface 28. Cabinet spine 26 serves as a backing upon which to rests books, files and other items which are transported from one location to another location in collapsible cart 20. Additionally, cabinet spine 26 serves as a support structure which support shelves, such as first collapsible shelf 40, books, and other items which are placed on first collapsible shelf 40. As a support structure, cabinet spine 26 is constructed from rigid material, like steel, aluminum, fiberglass, plastic, or wood, which can be used to support collapsible shelves and items placed on the collapsible shelves. In one preferred embodiment of this invention, cabinet spine 26 is made from wood, since wood is easy to handle, costs less most other materials, and is easily malleable. As a backing upon which to rests books, files and other items, cabinet spine 26 is manufactured from a solid, flat sheet of material, a wire mesh, or any other combination of materials and shapes which can support a shelve and serve as a backing for items placed on the shelves.

First collapsible shelf 40 is pivotally mounted onto first surface 28 of cabinet spine 26. First collapsible shelf 40 is movable between a first position generally perpendicular with respect to cabinet spine 26 and a second position generally parallel with respect to cabinet spine 26. In one preferred embodiment of this invention, first collapsible shelf 40 is pivotally mounted onto first surface 28 by using pivot mount 46 having first joint 47 and second joint 48. Preferably, pivot mount 46 comprises a continuous hinge which runs across the length between first collapsible shelf 40 and cabinet spine 26. However, pivot mount 46 may comprise a pin attached at each end of first collapsible shelf 40 and into cabinet spine 26, which allows first collapsible shelf 40 to be movable between a first and second position.

Figure 5:
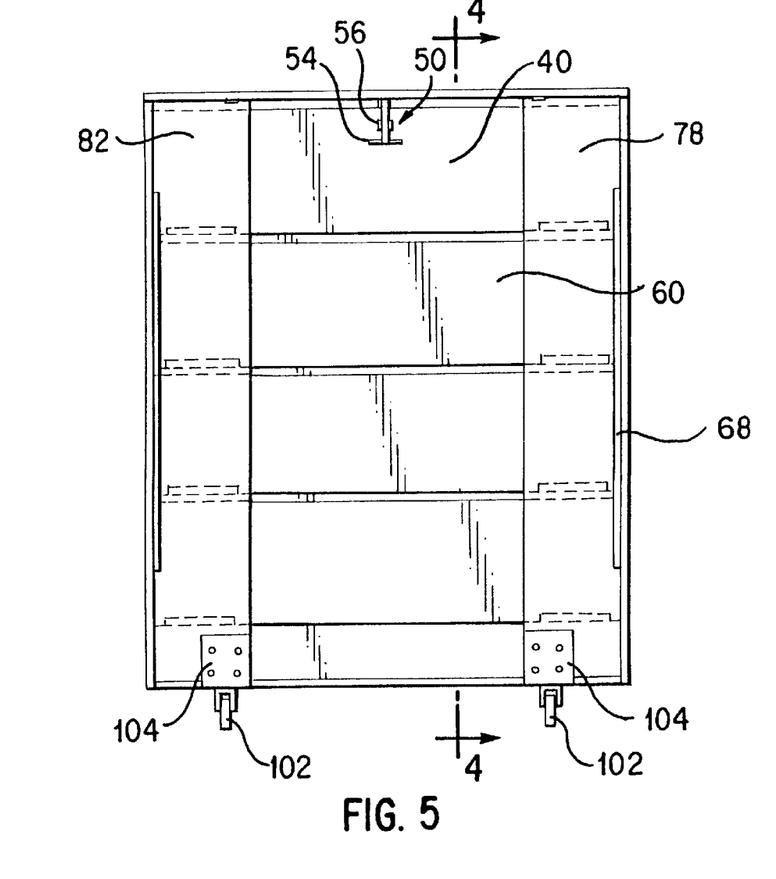
FIG. 5 is a front view of a collapsible cart in the collapsed position according to one embodiment of this invention.
Figure 6:
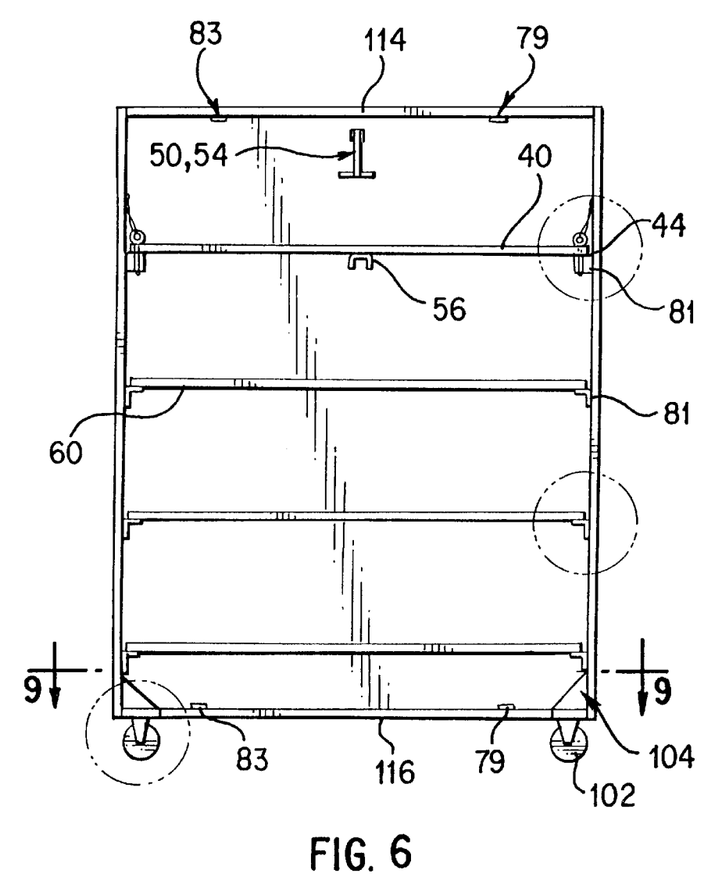
FIG. 6 is a front view of a collapsible cart in the transport position according to one embodiment of this invention.

First fastener 50 is attached to cabinet spine 26 and is coupled with respect to first collapsible shelf 40 when first collapsible shelf 40 is in the second position. In one preferred embodiment of this invention, first fastener 50 comprises retaining tee 54 which couples to latch 56, a U-shaped member, as shown in FIGS. 5–6. When first collapsible shelf 40 is moved to the second position, retaining tee 54 swings downward and is coupled with latch 56, thus retaining collapsible shelf 40 in the second position. While it is to use retaining tee 54 and latch 56, other suitable devices may be coupled with respect to first collapsible shelf 40 to retain first collapsible shelf in the second position. For example, a pair of magnets mounted onto first surface 28 and first collapsible shelf 40, or even a hook and a loop may be used to retain collapsible shelf 40 in the second position.

Figure 10:
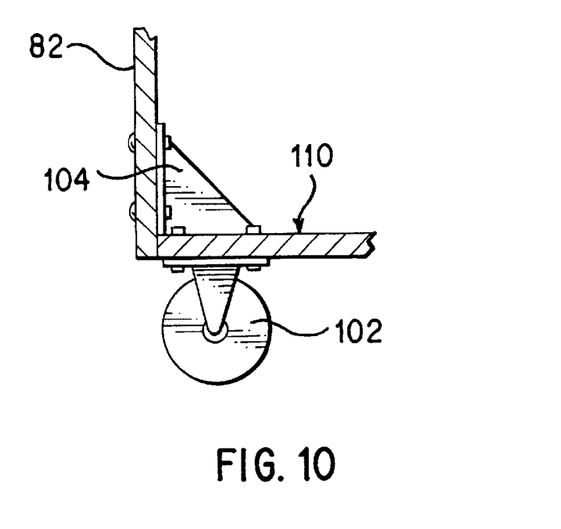
FIG. 10 is yet another enlarged sectional view of the collapsible cart shown in FIG. 6, according to one embodiment of this invention.

A plurality of wheels 92 are mounted underneath collapsible cart 20 so that collapsible 20 may be transported form one location to another location. Preferably, wheels 92 are of the type commonly known as castors 102, as shown in FIG. 10. However, any type of wheel which is generally round in shape and can be mounted may be used for wheel 92. In one preferred embodiment, wheels 92 are castors 102 mounted underneath collapsible cart 20 and support by corner struts 104 and cabinet base 110. While in this embodiment, castors 102 are rotatable about an axis, and allow collapsible cart 20 to be easily pushed in any direction, castors 102 may be fixed and not rotatable about an axis.

Figure 9:
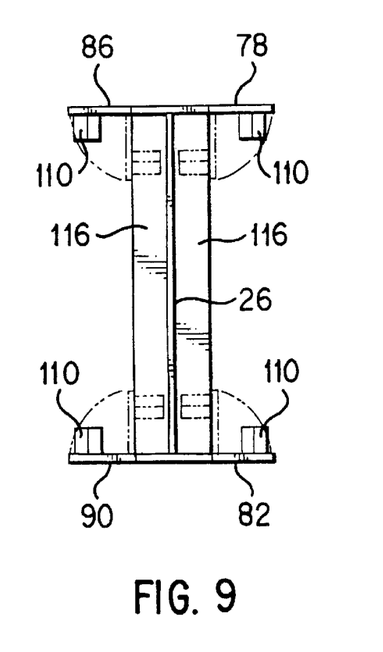
FIG. 9 is a top cross sectional view of a collapsible cart in the transport position as shown in FIG. 6, according to one embodiment of this invention.

Corner struts 104 are made from a rigid material, like steel, aluminum or wood. In one preferred embodiment of this invention, corner struts 104 are made from steel. In one preferred embodiment of this invention, wheels 92 are mounted directly onto cabinet base 110, as shown in FIG. 10. Cabinet base 110 is made from a rigid material, like steel, aluminum or wood. Cabinet base 110 is attached to at least one of first door 78, second door 82, third door 86, and fourth door 90 as shown in FIG. 9.

Preferably wheels 92 are spaced out so that collapsible cart is evenly supported by and balanced onto wheels 92. In one preferred embodiment of this invention, wheels 92 may be mounted underneath and along cabinet spine 26. However, mounting wheels 92 along cabinet spine 26 would require a user to tilt cabinet spine 20 in order to move cabinet spine 20 from one location to another. Preferably, at least one addition support member is attached to cabinet spine 26. This additional support member projects outwards and away from cabinet spine 26 to create a wide base of support for collapsible cart 20. At one end the additional support member is attached to cabinet spine 26, while at the other end the additional support member is attached to a wheel 92.

Figure 3:
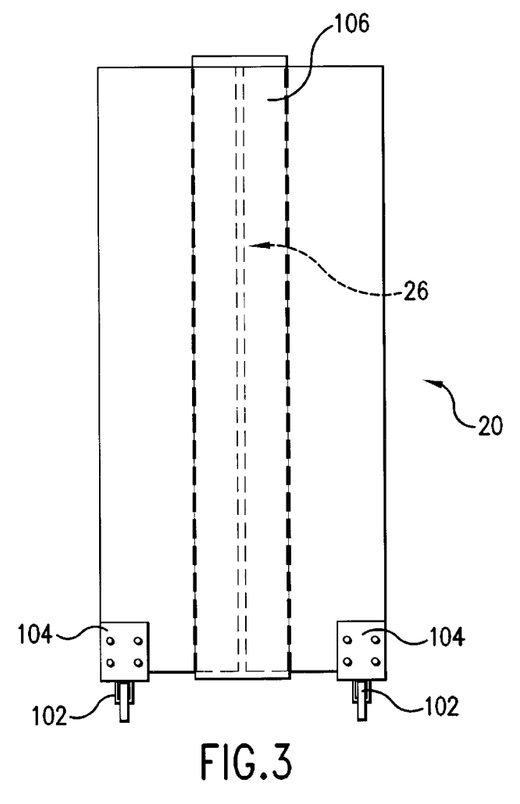
FIG. 3 is a side view of a collapsible cart in the transport position according to one embodiment of this invention.
Figure 4:
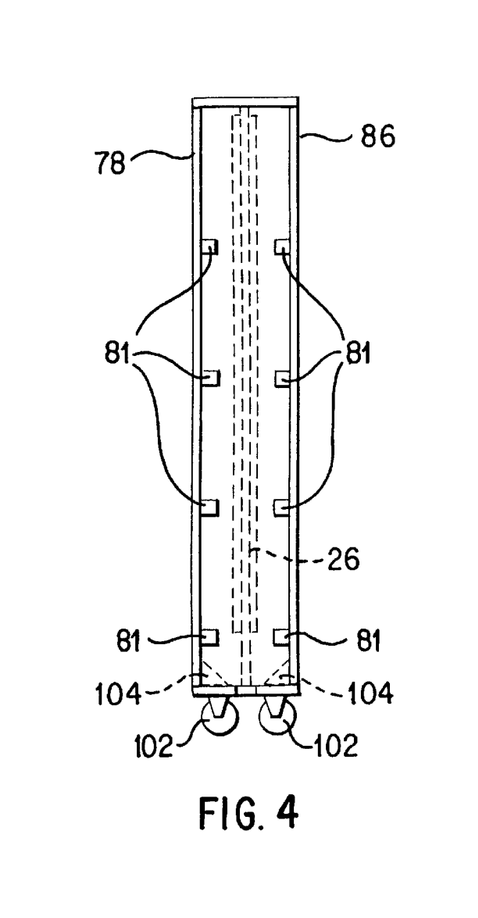
FIG. 4 is a side cross sectional view of a collapsible cart in the collapsed position as shown in FIG. 5, according to one embodiment of this invention.

Collapsible cart 20 is movable between a collapsed position, for transporting collapsible cart 20 from one location to another, and a transport position, for transporting books, files and other items. The user may move collapsible cart 20 to the collapsed position by moving first collapsible shelf 40 from the first position to the second position and coupling first collapsible shelf 40 with respect to the first fastener 50, as shown in FIGS. 4–5. In the collapsed position, collapsible cart 20 occupies much less space and therefore can more easily be transported from one location to another. Additionally, the collapsed position allows more collapsible carts 20 to fit in a given space, and therefore more collapsible carts 20 can be transported from one area to another than the transport position. For example, when transporting a number of collapsible carts 20 to a job site using a truck, at least twice as many collapsible carts 20 may be fitted onto the truck. Once collapsible carts 20 arrive at the job site, they can be moved from the collapsed position to the transport position by unfastening first collapsible shelf 40 from first fastener 50, and moving first collapsible shelf 40 from the second position to the first position, allowing books, files and other items to be placed onto first collapsible shelf 40, as shown in FIGS. 2–3.

In one preferred embodiment of this invention, second collapsible shelf 60 is pivotally mounted to first surface 28 of cabinet spine 26. As shown in FIG. 2, second collapsible shelf 60 is movable between a first position generally perpendicular with respect to cabinet spine 26 and a second position generally parallel with respect to cabinet spine 26. First connecting arm 68 is fastened to first collapsible shelf 40 and to second collapsible shelf 60, so that when first collapsible shelf 40 is moved from the first position to the second position, second collapsible shelf 60 is also moved from the first position to the second position. By fastening first connecting arm 68 to first collapsible shelf 40 and second collapsible shelf 60, a user can raise both first collapsible shelf 40 and second collapsible shelf 60 simultaneously. By allowing all of the collapsible shelves mounted to the second surface 30 to be raised simultaneously, the transformation of collapsible cart 20 from a collapsed position, for transporting collapsible cart 20 from one location to another, to a transport position, for transporting books, files and other items, is made easier.

Figure 2:
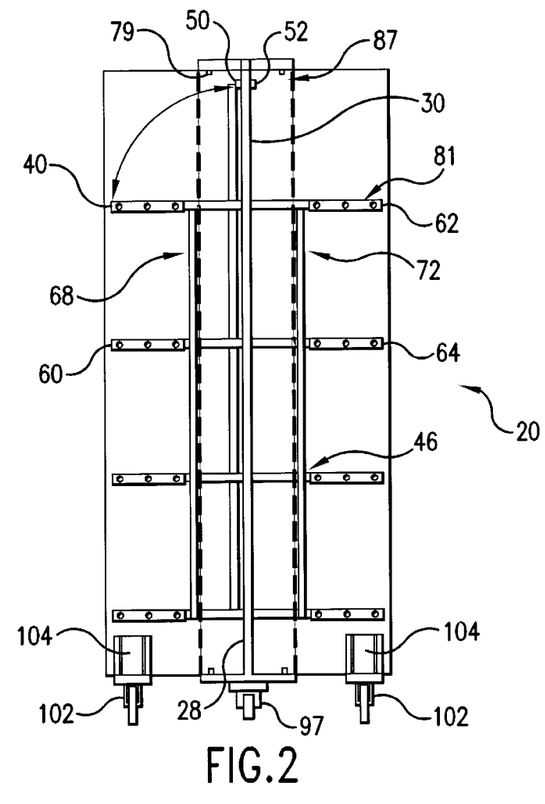
FIG. 2 is a side cross sectional view of a collapsible cart in the transport position as shown in FIG. 1, according to one embodiment of this invention.

While in this preferred embodiment only two collapsible shelves are pivotally mounted to first surface 28, additional collapsible shelves may be pivotally mounted to first surface 28, as shown in FIG. 2. The additional collapsible shelves pivotally mounted to first surface 28 may all be connected to first connecting arm 68 so that all the collapsible shelves mounted to first surface 28 may be placed in the first or second position simultaneously.

While in this preferred embodiment only one connecting arm 68 is used, additional connecting arms 68 may be fastened to any or all of the collapsible shelves. For example, one connecting arm 68 may be fastened to each side of first collapsible shelf 40 and second collapsible shelf 60 in order to provide additional support when raising first and second collapsible shelves 40, 60 and placing collapsible cart 20 in the collapsed position.

In one preferred embodiment of this invention, first door 78 is pivotally mounted to cabinet spine 26. As shown in FIG. 9, first door 78 is movable between an open position generally perpendicular with respect to first surface 28 and a closed position generally parallel with respect to first surface 28. Second door 82 is pivotally mounted to cabinet spine 26 and opposed to first door 78. Second door 82 is also movable between an open position generally perpendicular with respect to first surface 28 and a closed position generally parallel with respect to first surface 28. In this embodiment, a user may move collapsible cart 20 to the collapsed position by moving first collapsible shelf 40 from the first position to the second position and coupling first collapsible shelf 40 with respect to first fastener 50. Additionally, the user must then move first door 78 and second door 82 from an open to a closed position. A first door fastener 79 may be placed on cabinet spine 26 and first door 78 so that first door 78 may be coupled with respect to cabinet spine 26 in the closed position. Similarly, a second door fastener 83 may be placed on cabinet spine 26 and second door 82 so that second door 82 may be coupled with respect to cabinet spine 26 in the closed position. In one preferred embodiment of this invention, first door 78 and second door 82 are used as support members and are coupled with respect to a plurality of wheels 92 mounted underneath first door 78, second door 82, and cabinet spine 26, as shown in FIGS. 1–2. A first wheel 94 is mounted underneath first door 78, a second wheel 96 is mounted underneath second door 82, and a wheel 97 is mounted underneath the cabinet spine 26.

In one preferred embodiment of this invention, first door 78 comprises inside surface 80 and support body 81, wherein inside surface 80 faces cabinet spine 26 when first door 78 is in the closed position, and support body 81 is attached to inside surface 80 of first door 78 and positioned underneath first collapsible shelf 40, as shown in FIG. 6. Support body 81 is designed to support the weight of a shelf, such as first collapsible shelf 40, along with any books, files or other items placed on the shelf. In one preferred embodiment of this invention, an additional support body 81 is attached to inside surface 80 of second door 82, wherein inside surface 80 of second door 82 faces cabinet spine 26 when second door 78 is in the closed position, as shown in FIG. 6. The additional support body 81 attached to inside surface 80 of second door 82 is positioned underneath first collapsible shelf 40 to provide additional support. Support body 81 may be, but is not limited to, a bracket or step mounted onto inside surfaces 80 of first door 78 and second door 82. Support bodies 81 provide the additional support required to support a shelf, such as first collapsible shelf 40, filled with books, files or other items.

In one preferred embodiment of this invention, cabinet spine 26 further comprises second surface 30 opposed to first surface 28. Additional shelves may be mounted onto second surface 30, as shown in FIG. 2. In one preferred embodiment of this invention, third collapsible shelf 62 is pivotally mounted to second surface 30 of cabinet spine 26, wherein third collapsible shelf 62 is movable between a first position generally perpendicular with respect to cabinet spine 26 and a second position generally parallel with respect to cabinet spine 26. Second fastener 52 is attached to cabinet spine 26 so that third collapsible shelf 62 is coupled with respect to second fastener 52 when in the second position.

In one preferred embodiment of this invention, fourth collapsible shelf 64 is pivotally mounted to second surface 30 of cabinet spine 26. As shown in FIG. 2, fourth collapsible shelf 64 is movable between a first position generally perpendicular with respect to cabinet spine 26 and a second position generally parallel with respect to cabinet spine 26. Second connecting arm 72 is fastened to third collapsible shelf 62 and to fourth collapsible shelf 64, so that when third collapsible shelf 62 is moved from the first position to the second position, fourth collapsible shelf 64 is also moved from the first position to the second position. By fastening a second connection arm to third collapsible shelf 62 and fourth collapsible shelf 64, a user can raise both third collapsible shelf 62 and fourth collapsible shelf 64 simultaneously, and transform collapsible cart 20 from a collapsed position to a transport position. While in this embodiment only two collapsible shelves are pivotally mounted to second surface 30, additional collapsible shelves may be pivotally mounted to second surface 30, as shown in FIG. 2. The additional collapsible shelves pivotally mounted to second surface 30 may all be connected to second connecting arm 72 so that all the collapsible shelves mounted to second surface 30 may be placed in the first or second position simultaneously.

The collapsible shelves are constructed from rigid material, like steel aluminum, fiberglass, plastic or wood, since the collapsible shelves need to support a heavy loads, like a shelf full of books. In one preferred embodiment of this invention, the collapsible shelves are made of wood since wood is easily malleable. In one preferred embodiment of this invention, the collapsible shelves are mounted in a generally horizontal position, parallel with the ground.

In one preferred embodiment of this invention, third door 86 and fourth door 90 are pivotally mounted to cabinet spine 26, in much the same manner as first door 78 and second door 82, as shown in FIG. 9. Third door 86 and four door 90 are movable between an open position generally perpendicular with respect to second surface 30 and a closed position generally parallel with respect to second surface 30. Fourth door 90 is pivotally mounted to cabinet spine 26 and opposed to third door 86. In this embodiment, a user may move collapsible cart 20 to the collapsed position by moving first collapsible shelf 40 and third collapsible shelf 62 from the first position to the second position and coupling first collapsible shelf 40 with respect to first fastener 50 and third collapsible shelf 62 with respect to second fastener 52. Additionally, the user must then move first door 78, second door 82, third door 86, and fourth door 90 from an open to a closed position.

In one preferred embodiment of this invention, a third door fastener 87 is placed on cabinet spine 26 and third door 86 so that third door 86 may be coupled with respect to cabinet spine 26 in the closed position, as shown in FIG. 2. Similarly, a fourth door fastener (not shown) is placed on cabinet spine 26 and fourth door 90 so that fourth door 90 may be coupled with respect to cabinet spine 26 in the closed position. In one preferred embodiment of this invention, third door 86 and fourth door 90 are used as support member and are coupled with respect to wheels 92 mounted underneath first door 78, second door 82, third door 86, and fourth door 90. First door 78 coupled with first wheel 94, second door 82 coupled with second wheel 96, third door 86 coupled with third wheel (not shown), and fourth door 90 coupled with fourth wheel 100, as shown in FIG. 1. While in the above preferred embodiments only one door fastener is used per door 78, 82, 86, 90, additional door fasteners 79, 83, 87, 91 may be used. For example, two first door fasteners 79 and two second door fasteners 83 may be used to couple first door 78 and second door 82 with respect to cabinet spine 26, as shown in FIG. 6.

In one preferred embodiment of this invention, third door 86 comprises inside surface 80 and support body 81, wherein inside surface 80 faces cabinet spine 26 when third door 86 is in the closed position, and support body 81 is attached to inside surface 80 of third door 86 and positioned underneath third collapsible shelf 62. In one preferred embodiment of this invention, an additional support body 81 is attached to inside surface 80 of fourth door 90, wherein inside surface 80 of fourth door 90 faces cabinet spine 26 when fourth door 90 is in the closed position. The additional support body 81 attached to inside surface 80 of fourth door 90 is positioned underneath third collapsible shelf 62 to provide additional support. While support bodies, 44 are described only to support first collapsible shelf 40 and third collapsible shelf 62, support bodies 81 may be added to inside surfaces 80 of first door 78, second door 82, third door 86, and fourth door 90 to support any number of collapsible shelves mounted onto first surface 28 or second surface 30 of cabinet spine 26.

In one preferred embodiment of this invention first spine extension 106 is mounted at one end of cabinet spine 26, generally perpendicular to cabinet spine 26, and second spine extension 108 is mounted at another end of cabinet spine 26, generally perpendicular to cabinet spine 26 and opposed to first spine extension 106, as shown in FIG. 1. Spine extensions 106, 108 are designed to support the weight of first door 78, second door 82, third door 86, and fourth door 90. Since spine extensions 106, 108 are used to provide additional support, they are made from the same rigid materials as cabinet spine 26. In one preferred embodiment of this invention, spine extensions 106, 108 are made from wood. In addition to supporting the weight of first door 78, second door 82, third door 86, and fourth door 90, spine extensions 106, 108 provide additional structural support for collapsible cart 20. First door 78 is pivotally mounted to one end of first spine extension 106. Additionally, third door 86 is mounted to another end of first spine extension 106, opposed to first door 78. Second door 82 is pivotally mounted to one end of second spine extension 108. Fourth door 90 is mounted to another end of second spine extension 108, opposed to second door 82.

In one preferred embodiment of this invention third spine extension 114 is mounted at the top of cabinet spine 26, generally perpendicular to cabinet spine 26, and fourth spine extension 116 is mounted at the bottom of cabinet spine 26, generally perpendicular to cabinet spine 26 and opposed to third spine extension 114, as shown in FIGS. 1 and 6. Spine extensions 114, 116 are designed to provide additional structural support to collapsible cart 20. Since spine extensions 114, 116 are used to provide additional support, they are made from the same rigid materials as cabinet spine 26. However, spine extensions 114, 116 can be made from any rigid material such as steel, aluminum, or wood.

Figure 11:
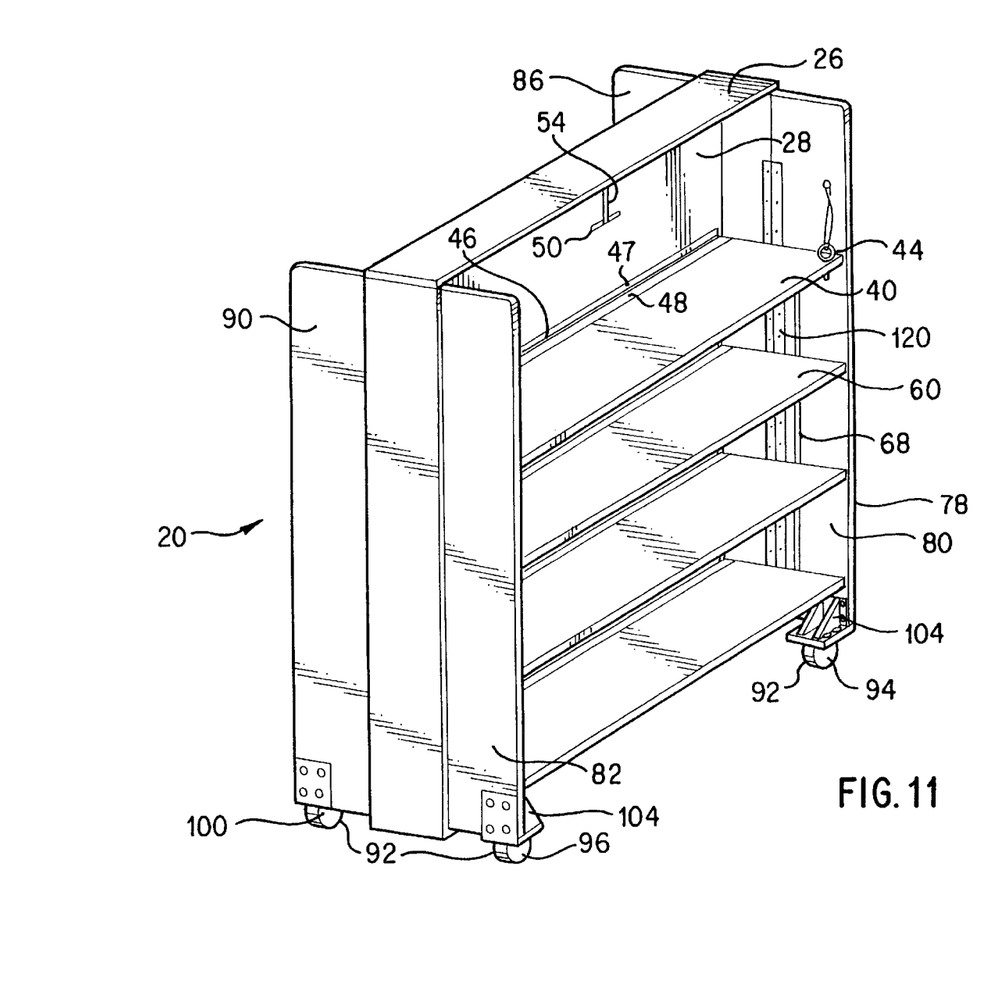
FIG. 11 is a perspective view of a collapsible cart in the transport position according to one embodiment of this invention.

In one preferred embodiment of this invention, first, second, third, and fourth door 78, 82, 86, 90 are pivotally mounted to cabinet spine 26 or spine extensions 106, 108 by using pivot mount 46 having first joint 47 and second joint 48, as shown in FIG. 1. Preferably, pivot mount 46 comprises continuous hinge 120 which runs across the length between the first, second, third, or fourth door 78, 82, 86, 90 and cabinet spine 26 or spine extensions 106, 108, as shown in FIG. 11. However, pivot mount 46 may comprise a pin attached at each end of first, second, third, or fourth door 78, 82, 86, 90 and into cabinet spine 26 or spine extensions 106, 108, which allows first, second, third, or fourth door 78, 82, 86, 90 to be movable between a first and second position. Pivot mount 46 may also comprise a series of hinges 112, as shown in FIG. 1.

Figure 7:
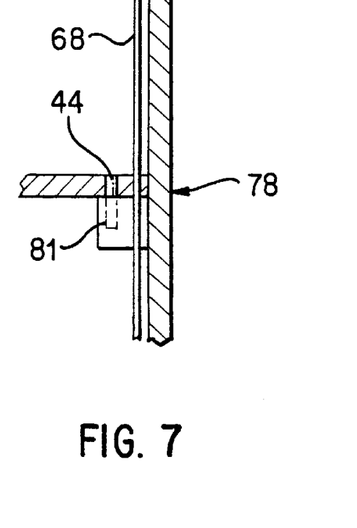
FIG. 7 is an enlarged sectional view of the collapsible cart shown in FIG. 6, according to one embodiment of this invention.
Figure 8:
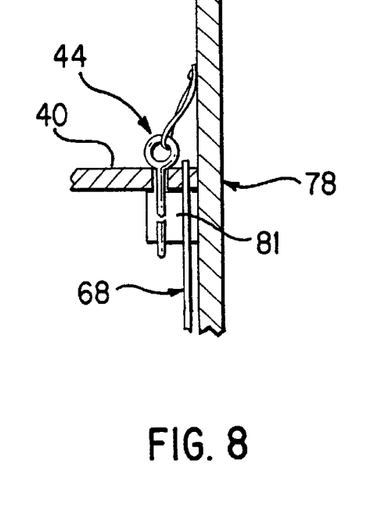
FIG. 8 is another enlarged sectional view of the collapsible cart shown in FIG. 6, according to one embodiment of this invention.

In one preferred embodiment of this invention, first, second, third, or fourth door 78, 82, 86, 90 are held in place by retaining pin 44, as shown in FIGS. 6–8. Retaining pin 44 goes through a collapsible shelf and into or through a support body 81. In this way, retaining pin 81 prevents first, second, third, or fourth door 78, 82, 86, 90 from moving while collapsible cart 20 is in the transport position.

While in the foregoing specification this invention has been described in relation to certain embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A collapsible cart for transporting books, files, and other items, the collapsible cart comprising:
   a cabinet spine having a first surface, a second surface, a first side edge, a second side edge, a top end edge, and a bottom end edge;
   a first spine extension mounted generally perpendicular to the cabinet spine along the first side edge of the cabinet spine;
   a second spine extension mounted generally perpendicular to the cabinet spine along the second side edge of the cabinet spine;
   a third spine extension mounted generally perpendicular to the cabinet spine along the top end edge of the cabinet spine;
   a fourth spine extension mounted generally perpendicular to the cabinet spine along the bottom end edge of the cabinet spine;
   a first door pivotally mounted adjacent to the first spine extension, movable between an open position generally perpendicular to the first surface of the cabinet spine and a closed position generally parallel to the first surface of the cabinet spine;
   a second door pivotally mounted adjacent to the second spine extension, movable between an open position generally perpendicular to the first surface of the cabinet spine and a closed position generally parallel to the first surface of the cabinet spine;
   a first plurality of collapsible shelves mounted to the first surface of the cabinet spine and between the first and second spine extensions, each of the shelves movable between an open position extending from the first surface of the cabinet spine and a closed position generally parallel to the first surface of the cabinet spine;
   a plurality of wheels mounted underneath the collapsible cart;
   a third door pivotally mounted adjacent to the first spine extension, movable between an open position generally perpendicular to the second surface of the cabinet spine and a closed position generally parallel to the second surface of the cabinet spine;
   a fourth door pivotally mounted adjacent to the second spine extension, movable between an open position generally perpendicular to the second surface of the cabinet spine and a closed position generally parallel to the second surface of the cabinet spine; and
   a second plurality of collapsible shelves mounted to the second surface of the cabinet spine and between the first and second spine extensions, each of the shelves movable between an open position extending from the second surface of the cabinet spine and a closed position generally parallel to the second surface of the cabinet spine.

2. The collapsible cart of claim 1, wherein the first plurality of collapsible shelves comprises at least three collapsible shelves mounted to the first surface of the cabinet spine and between the first and second spine extensions, each of the shelves movable between an open position extending from the cabinet spine and a closed position generally parallel to the cabinet spine.

3. The collapsible cart of claim 1, wherein the first plurality of collapsible shelves comprises at least four collapsible shelves mounted to the first surface of the cabinet spine and between the first and second spine extensions, each of the shelves movable between an open position extending from the cabinet spine and a closed position generally parallel to the cabinet spine.

4. The collapsible cart of claim 1, further comprising a plurality of pivot mounts attached to the first surface of the cabinet spine for mounting the first plurality of collapsible shelves to the first surface of the cabinet spine.

5. The collapsible cart of claim 1, further comprising at least one connecting arm fastened to each of the first plurality of collapsible shelves.

6. The collapsible cart of claim 1, wherein each of the first and second doors further comprises a plurality of support bodies for supporting the first plurality of collapsible shelves when the doors and shelves are in the open positions.

7. The collapsible cart of claim 1, wherein the first and second pluralities of collapsible shelves each comprise at least three collapsible shelves mounted to the respective first and second surfaces of the cabinet spine and between the first and second spine extensions, each of the shelves movable between an open position extending from the cabinet spine and a closed position generally parallel to the cabinet spine.

8. The collapsible cart of claim 1, wherein the first and second pluralities of collapsible shelves each comprise at least four collapsible shelves mounted to the respective first and second surfaces of the cabinet spine and between the first and second spine extensions, each of the shelves movable between an open position extending from the cabinet spine and a closed position generally parallel to the cabinet spine.

9. The collapsible cart of claim 1, further comprising a first connecting arm fastened to each of the first plurality of collapsible shelves, and a second connecting arm fastened to each of the second plurality of collapsible shelves.

10. The collapsible cart of claim 1, wherein each of the first and second doors further comprises a plurality of support bodies for supporting the first plurality of collapsible shelves when the first and second doors and first plurality of collapsible shelves are in the open positions, and each of the third and fourth doors further comprises a plurality of support bodies for supporting the second plurality of collapsible shelves when the third and fourth doors and second plurality of collapsible shelves are in the open positions.

11. The collapsible cart of claim 1, further comprising a first fastener attached to the cabinet spine, the first plurality of collapsible shelves coupled with respect to the first fastener when in the second position.

12. The collapsible cart of claim 11, wherein the first fastener comprises a retaining tee.

13. A collapsible cart for transporting books, files, and other items, the collapsible cart comprising:

- a cabinet spine having a first surface, a second surface, a first side edge, a second side edge, a top end edge, and a bottom end edge;
- a first spine extension mounted generally perpendicular to the cabinet spine along the first side edge of the cabinet spine;
- a second spine extension mounted generally perpendicular to the cabinet spine along the second side edge of the cabinet spine;
- a third spine extension mounted generally perpendicular to the cabinet spine along the top end edge of the cabinet spine;
- a fourth spine extension mounted generally perpendicular to the cabinet spine along the bottom end edge of the cabinet spine;
- a first door pivotally mounted adjacent to the first spine extension, movable between an open position generally perpendicular to the first surface of the cabinet spine and a closed position generally parallel to the first surface of the cabinet spine;
- a second door pivotally mounted adjacent to the second spine extension, movable between an open position generally perpendicular to the first surface of the cabinet spine and a closed position generally parallel to the first surface of the cabinet spine;
- a first plurality of collapsible shelves mounted to the first surface of the cabinet spine and between the first and second spine extensions, each of the shelves movable between an open position extending from the first surface of the cabinet spine and a closed position generally parallel to the first surface of the cabinet spine;
- a third door pivotally mounted adjacent to the first spine extension, movable between an open position generally perpendicular to the second surface of the cabinet spine and a closed position generally parallel to the second surface of the cabinet spine;
- a fourth door pivotally mounted adjacent to the second spine extension, movable between an open position generally perpendicular to the second surface of the cabinet spine and a closed position generally parallel to the second surface of the cabinet spine; and
- a second plurality of collapsible shelves mounted to the second surface of the cabinet spine and between the first and second spine extensions, each of the shelves movable between an open position extending from the second surface of the cabinet spine and a closed position generally parallel to the second surface of the cabinet spine.

14. The collapsible cart of claim 13, further comprising a plurality of wheels mounted to the collapsible cart.

15. The collapsible cart according to claim 14, wherein the plurality of wheels comprises a first wheel mounted underneath the first door, a second wheel mounted underneath the second door, a third wheel mounted underneath the third door, and a fourth wheel mounted underneath the fourth door.

* * * * *